United States Patent
Mizuguchi

(10) Patent No.: US 8,390,632 B1
(45) Date of Patent: Mar. 5, 2013

(54) RENDERING DEVICE, NON-TRANSITORY COMPUTER READABLE MEDIUM, AND IMAGE OUTPUT APPARATUS

(75) Inventor: Takuya Mizuguchi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 13/543,037

(22) Filed: Jul. 6, 2012

(30) Foreign Application Priority Data

Sep. 12, 2011 (JP) .................. 2011-198203

(51) Int. Cl.
*G06F 15/80* (2006.01)
*G06K 9/54* (2006.01)
*G06K 9/60* (2006.01)
(52) U.S. Cl. ....................... 345/505; 382/304
(58) Field of Classification Search .................. None
See application file for complete search history.

(56) References Cited

U.S. PATENT DOCUMENTS

| | | | | |
|---|---|---|---|---|
| 7,505,172 B2* | 3/2009 | Vondran et al. | ................ | 358/1.9 |
| 2010/0231952 A1* | 9/2010 | Giannetti et al. | ............ | 358/1.15 |

FOREIGN PATENT DOCUMENTS

| | | |
|---|---|---|
| JP | 2000-172725 A | 6/2000 |
| JP | 2000-335022 A | 12/2000 |

OTHER PUBLICATIONS

W. Nie et al., "A dynamic parallel volume rendering computation mode based on cluster", In ICCSA'05 Proceedings of the 2005 international conference on Computational Science and Its Applications—Volume Part III, pp. 416-425.*

* cited by examiner

*Primary Examiner* — Kee M Tung
*Assistant Examiner* — Haixia Du
(74) *Attorney, Agent, or Firm* — Sughrue Mion, PLLC

(57) ABSTRACT

A rendering device includes a temporary memory, rendering processing units, and a rendering control unit. The temporary memory stores one or more rendering instructions and rendered results therefor in association. The rendering processing units perform rendering processing in accordance with a rendering instruction, store, when one or more similar rendering instructions exist for pages for which rendering processing was consecutively performed, the rendering instructions and rendered results therefor in association in the temporary memory, and read and use, when rendered results associated with one or more rendering instructions are stored, the rendered results. The rendering control unit performs control for assigning a rendering instruction to one of the rendering processing units and causing the rendering processing unit to perform rendering processing, calculates the usage rate of stored rendered results at a timing, and performs switching of an assigning method when the usage rate is lower than a threshold.

14 Claims, 7 Drawing Sheets

FIG. 5A

| CACHING CHECK : FOR EVERY | 10 | PAGES |
|---|---|---|
| THRESHOLD FOR CACHING USAGE RATE : | 5 | % |

FIG. 5B

| ASSIGNING METHOD | PRIORITY |
|---|---|
| • FIRST-IN FIRST-SERVED (DEFAULT) | (DEFAULT) |
| • ODD NUMBER PAGES AND EVEN NUMBER PAGES SEPARATELY | (1) |
| • FOR EVERY n PAGES | (2) |
| • FROM FIRST PAGE AND FROM LAST PAGE | (3) |
| • USER DEFINITION 5 | (4) |
| • USER DEFINITION 6 | (5) |

RENDERING DEVICE, NON-TRANSITORY COMPUTER READABLE MEDIUM, AND IMAGE OUTPUT APPARATUS

CROSS-REFERENCE TO RELATED APPLICATIONS

This application is based on and claims priority under 35 USC 119 from Japanese Patent Application No. 2011-198203 filed Sep. 12, 2011.

BACKGROUND (i) Technical Field

The present invention relates to a rendering device, a non-transitory computer readable medium, and an image output apparatus.

(ii) Related Art

In general, rendering processing is performed in accordance with rendering instructions, and images are generated. In recent years, high-speed rendering processing has been achieved by providing plural units (rendering processors) that perform such rendering processing, compared to the case where a single rendering processor is provided. In a configuration including such plural rendering processors, for example, rendering processing is assigned to individual rendering processors in units of pages, and rendering processing for the next page is assigned to a rendering processor that has terminated processing assigned thereto.

In the case where images of plural pages are to be rendered, similar rendering instructions may be given. In such a case, a so-called "caching technique" is employed. In the caching technique, a series of rendering instructions and the results of rendering processing performed in accordance with the series of rendering instructions are stored in association with each other, and when a series of similar rendering instructions are received, corresponding rendered results are read and used. With the caching technique, processing time is shortened compared to the case where rendering processing is always performed in accordance with rendering instructions.

The caching technique may be employed for the case where plural rendering processors are provided. In this case, temporary memories are provided so as to correspond to individual rendering processors, and the rendering processors independently perform caching control. Thus, when rendering instructions are given in a regular page order and rendering processing for pages including similar rendering instructions is assigned to a single rendering processor, registration to a corresponding temporary memory is made and the corresponding temporary memory is used. However, if allocation of pages to individual rendering processors is not performed successfully, not only are rendered results stored in temporary memories not used, but registration to the temporary memories is also not performed.

For example, the case where two rendering processors, that is, a first rendering processor and a second rendering processor, are provided and images of plural pages in which odd number pages are similar to each other and even number pages are similar to each other are to be rendered will be explained. In this case, the first rendering processor performs rendering for the first page, and the second rendering processor performs rendering for the second page. If the rendering for the first page is completed earlier than the rendering for the second page, the first rendering processor performs rendering for the third page, which is similar to the first page. One or more similar rendering instructions and rendered results for the one or more similar rendering instructions are stored in a temporary memory, and the rendered results are used for processing for later pages. However, when the first rendering processor performs rendering for the first page and the second rendering processor performs rendering for the second page, the rendering for the second page may be completed earlier than the rendering for the first page. In this case, the second rendering processor performs rendering for the third page and the first rendering processor performs rendering for the fourth page. Since each of the first and second rendering processors does not perform processing for pages similar to each other, rendered results are not stored in temporary memories. Thus, rendered results are not used for later processing.

SUMMARY

According to an aspect of the invention, there is provided a rendering device including a temporary memory, plural rendering processing units, and a rendering control unit. The temporary memory stores one or more rendering instructions and rendered results for the one or more rendering instructions in association with each other. The plural rendering processing units perform rendering processing in accordance with a rendering instruction, store, in a case where one or more similar rendering instructions exist for pages for which rendering processing was consecutively performed, the one or more rendering instructions and rendered results in association with each other in the temporary memory, and read and use, in a case where rendered results associated with one or more rendering instructions for rendering are stored in the temporary memory, the rendered results associated with the one or more rendering instructions. The rendering control unit performs control for assigning a given rendering instruction to a corresponding one of the plural rendering processing units and causing the corresponding one of the plural rendering processing units to perform rendering processing, calculates the usage rate of rendered results stored in the temporary memory at a predetermined timing, and performs switching of an assigning method for assigning a rendering instruction in a case where the usage rate is lower than a predetermined threshold.

BRIEF DESCRIPTION OF THE DRAWINGS

Exemplary embodiments of the present invention will be described in detail based on the following figures, wherein:

FIGS. 5A and 5B explain an example of setting screens in a setting unit;

DETAILED DESCRIPTION

Figure 1:
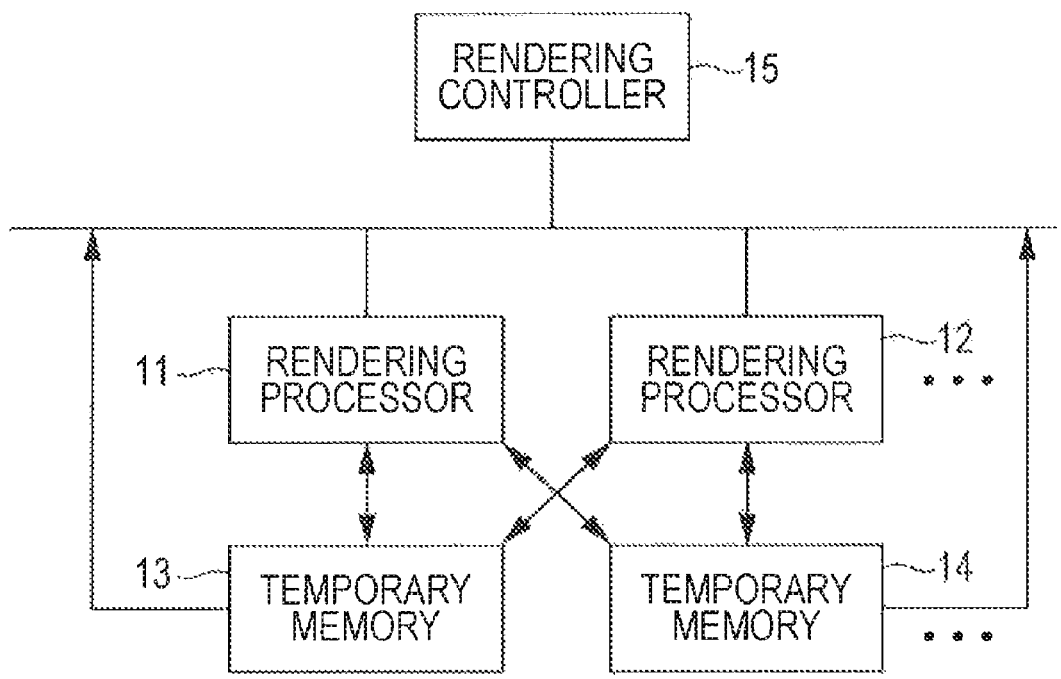
FIG. 1 is a diagram illustrating the configuration of a rendering device according to an exemplary embodiment of the invention.

FIG. 1 is a diagram illustrating the configuration of a rendering device according to an exemplary embodiment of the invention. Referring to FIG. 1, the rendering device includes rendering processors 11 and 12, temporary memories 13 and 14, and a rendering controller 15. The example illustrated in FIG. 1 illustrates the case where two rendering processors, that is, the rendering processor 11 and the rendering processor 12, are provided. However, the number of rendering processors is not limited. Three or more rendering processors may be provided.

Each of the rendering processors 11 and 12 performs, under the control of the rendering controller 15, rendering processing in accordance with an assigned rendering instruction for a page. In the case where one or more similar rendering instructions exist for pages for which rendering processing was consecutively performed, the one or more rendering instructions and rendered results for the one or more rendering instructions are stored in association with each other in a temporary memory (in this case, the temporary memory 13 for the rendering processor 11, and the temporary memory 14 for the rendering processor 12). Furthermore, in the case where one or more rendering instructions and rendered results for the one or more rendering instructions are stored in association with each other in a temporary memory (the temporary memory 13 or 14) and a received rendering instruction contains the stored one or more rendering instructions, the rendered results associated with the one or more rendering instructions are read and used as rendered results for the one or more rendering instructions in the received rendering instruction.

In the example illustrated in FIG. 1, the temporary memory 13 and the temporary memory 14 are provided for the rendering processor 11 and the rendering processor 12, respectively. The temporary memories 13 and 14 each store one or more rendering instructions and rendered results for the one or more rendering instructions in association with each other. In the case where there is no space to store another one or more rendering instructions and rendered results, one or more rendering instructions and rendered results may be deleted using a known method in which deletion is made in the order from the oldest one or in ascending order of use frequency and new one or more rendering instructions and rendered results may be stored. Although temporary memories are provided so as to correspond to individual rendering processors in this example, a temporary memory may be shared among plural rendering processors.

The rendering controller 15 assigns given rendering instructions to the rendering processor 11 and the rendering processor 12 in units of pages and causes the rendering processor 11 and the rendering processor 12 to perform rendering processing. The rendering controller 15 monitors the status of use of the temporary memory 13 and the temporary memory 14. The rendering controller 15 calculates the usage rate of rendered results stored in the temporary memories 13 and 14 at a predetermined timing. When the calculated usage rate is lower than a predetermined threshold, the rendering controller 15 performs switching of a rendering instruction assigning method. Plural rendering instruction assigning methods may be provided in advance, so that a user can set the method to be used. For example, priority may be given to individual methods, so that the method to be used can be selected in accordance with the given priority.

Figure 2:
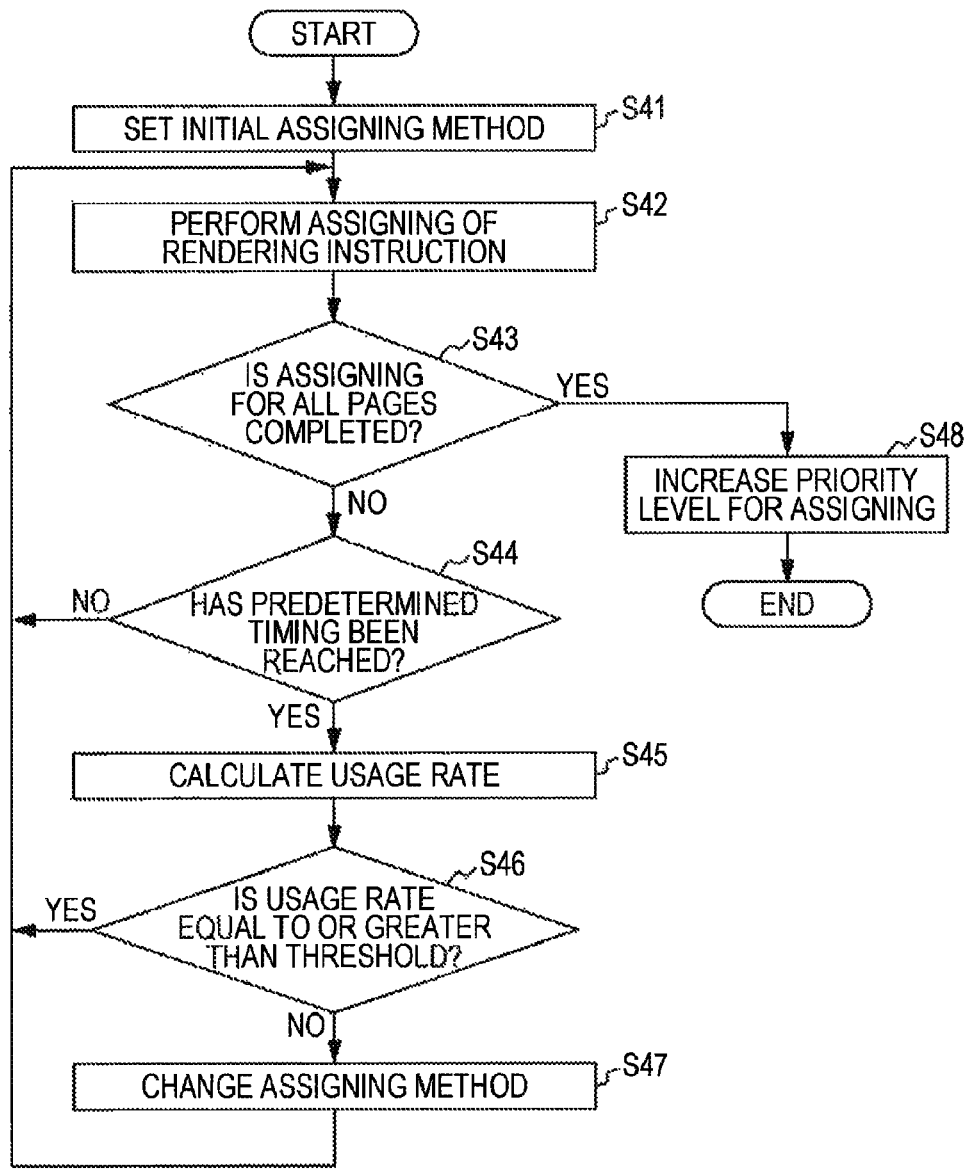
FIG. 2 is a flowchart illustrating an example of a process performed by a rendering controller of a rendering device according to an exemplary embodiment of the invention.

FIG. 2 is a flowchart illustrating an example of a process performed by a rendering controller of a rendering device according to an exemplary embodiment of the invention. When receiving rendering instructions for a series of pages, the rendering controller 15 sets a rendering instruction assigning method to be used in the initial stage in step S41. For example, an assigning method to be used in the default state may be determined in advance, and the assigning method may be set in step S41. Alternatively, in the case where priority is given to assigning methods, an assigning method at the highest priority level may be set. Obviously, an assigning method may be set in accordance with a different setting method.

In step S42, the rendering controller 15 assigns a rendering instruction for one page to the rendering processor 11 in accordance with the currently set assigning method. In step S43, it is determined whether or not assigning of rendering instructions for all pages is completed. When assigning of rendering instructions for all pages is not completed, the process proceeds to step S44. When assigning of rendering instructions for all pages is completed, rendering instruction assigning processing is terminated. In this example, however, the rendering controller 15 increases the priority level of the currently used rendering instruction assigning method in step S48. Therefore, the probability of this assigning method being selected when switching of an assigning method is to be performed increases. Obviously, the processing of step S48 is not necessarily performed.

In step S44, it is determined whether or not a predetermined timing has been reached. The predetermined timing may be set by establishing conditions based on various types of information, such as the number of pages, the number of rendering instructions, and the like, and it may be determined whether or not the conditions are met. When the predetermined timing has not been reached, the process returns to step S42 to perform assigning of the next rendering instruction.

When the predetermined timing has been reached, the usage rate of the temporary memories 13 and 14 is calculated in step S45. The usage rate of the temporary memories 13 and 14 may be calculated, for example, by dividing C by P, where P represents the number of pages for which rendering processing was performed by the rendering processors 11 and 12 and C represents the number of pages for which rendered results stored in the temporary memories 13 and 14 were used among the number of pages for which rendering processing was performed by the rendering processors 11 and 12. Alternatively, the usage rate of the temporary memories 13 and 14 may be calculated, for example, by dividing T by S, where S represents the size of images rendered by the rendering processors 11 and 12 and T represents the size of images rendered using rendered results stored in the temporary memories 13 and 14 of the size of the images rendered by the rendering processors 11 and 12. Obviously, the usage rate may be calculated using a different method.

In step S46, it is determined whether or not the usage rate calculated in step S45 is lower than a predetermined threshold. When the usage rate is equal to or higher than the predetermined threshold, it is determined that the temporary memories 13 and 14 are used in assigning of rendering instructions in accordance with the currently used assigning method, and the process returns to step S42 to continue to perform processing in the current assigning method.

When the usage rate is lower than the predetermined threshold, it is determined that the temporary memories 13 and 14 are not used in the current assigning method. In step S47, switching of a rendering instruction assigning method is performed. For example, switching of an assigning method is performed in a predetermined order. If priority is given to assigning methods, an assigning method may be selected and set in accordance with the priority. Alternatively, a method for performing assigning of rendering instructions in a page order depending on the device that is to receive rendered results by the rendering processors 11 and 12 may be selected, and the assigning method may be set. Obviously, an assigning method may be selected in accordance with various selecting methods, such as a method for analyzing the tendency of assigning of rendering instructions and selecting an assigning method in accordance with the result of the analysis, and the selected assigning method may be set.

Specific examples of rendering instruction assigning methods include a method for performing assigning in the order in which an assigning request was received from the rendering processor 11 or 12, a method for assigning rendering instructions for odd number pages to one rendering processor and assigning rendering instructions for even number pages to the other rendering processor, a method for assigning rendering instructions for consecutive n pages as a unit to a rendering processor, a method for assigning rendering instructions for the first page and the immediately subsequent page to one rendering processor and assigning rendering instructions for the last page and the immediately previous page to the other rendering processor, and the like. Obviously, a different assigning method may be set.

Furthermore, methods for performing assigning of rendering instructions in a page order depending on the device that is to receive rendered results include a method for discriminating between odd number pages and even number pages when the device allows an option of double-sided output, a method for performing assigning of rendering instructions for the first page and the last page and a method for performing assigning of rendering instructions for N pages when the device allows a finisher option, and the like. Obviously, an assigning method may be set and selected according to a different device configuration. Furthermore, an assigning method not depending on the device may be selected and set. Furthermore, an assigning method with a combination of depending on the device and not depending on the device may be selected and set.

After switching of the assigning method is performed, the process returns to step S42 to perform assigning of rendering instructions in accordance with the changed assigning method. When assigning of rendering instructions for all the pages is completed, the rendering instruction assigning processing is terminated. At this time, the priority level of the used rendering instruction assigning method may be increased in step S48.

Figure 3A:
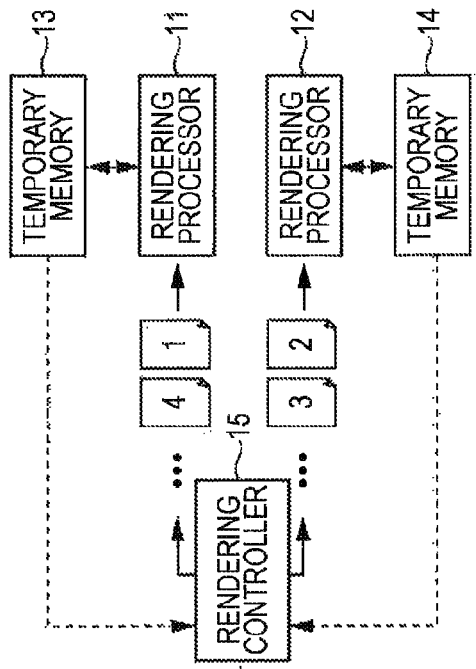
FIGS. 3A and 3B explain a specific example of an operation performed by a rendering controller of a rendering device according to an exemplary embodiment of the invention.
Figure 3B:
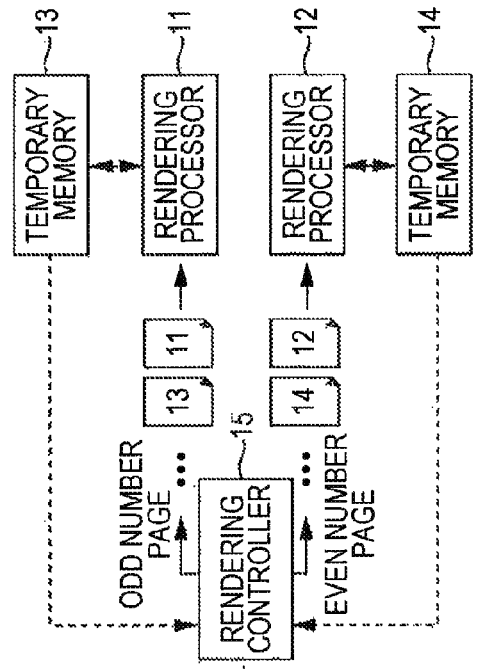

FIGS. 3A and 3B explain a specific example of the operation of a rendering controller of a rendering device according to an exemplary embodiment of the invention. In this specific example, one or more rendering instructions for odd number pages are similar to each other, one or more rendering instructions for even number pages are similar to each other, and rendering instructions for odd number pages are not similar to rendering instructions for even number pages.

FIG. 3A illustrates an example of assigning of rendering instructions in the case where a method for performing assigning of a rendering instruction for the next page in the order in which an assigning request was received is used as a rendering instruction assigning method for the initial stage. In the example illustrated in FIG. 3A, a rendering instruction for the first page is assigned to the rendering processor 11, and a rendering instruction for the second page is assigned to the rendering processor 12. Thus, the rendering processor 11 performs rendering processing for the first page, and the rendering processor 12 performs rendering processing for the second page. The rendering processing performed by the rendering processor 12 is completed earlier than the rendering processing performed by the rendering processor 11. Thus, the rendering processor 12 issues a request for a rendering instruction, and a rendering instruction for the third page is assigned to the rendering processor 12. Then, the rendering processor 11 issues a request for a rendering instruction, and a rendering instruction for the fourth page is assigned to the rendering processor 11.

In this case, for example, the rendering processor 11 performs rendering processing in accordance with the rendering instruction for the first page and then performs rendering processing in accordance with the rendering instruction for the fourth page. Since the rendering instruction for the first page is not similar to the rendering instruction for the fourth page, the rendering instructions and rendered results therefor are not registered to the temporary memory 13. Therefore, the temporary memory 13 is not used for rendering processing for the subsequent pages. Similarly, the rendering processor 12 performs rendering processing in accordance with the rendering instruction for the second page and then performs rendering processing in accordance with the rendering instruction for the third page. Since the rendering instruction for the second page is not similar to the rendering instruction for the third page, the rendering instructions and rendered results therefor are not registered to the temporary memory 14. Therefore, the temporary memory 14 is not used for rendering processing for the subsequent pages.

For example, at a timing after rendering processing for ten pages is performed, it is determined whether or not to perform switching of an assigning method. In the example illustrated in FIG. 3A, since a rendering instruction for an odd number page and a rendering instruction for an even number page are alternately assigned to a single rendering processor, registration to a temporary memory is not performed. Thus, the temporary memory is not used. Therefore, in this case, the usage rate of the temporary memory may be lower than a predetermined threshold.

When the usage rate is lower than the predetermined threshold, switching of a rendering instruction assigning method is performed. FIG. 3B illustrates an example in which a method for assigning rendering instructions for odd number pages to a rendering processor and assigning rendering instructions for even number pages to a different rendering processor is selected and set. In the example illustrated in FIG. 3B, rendering instructions for odd number pages are assigned to the rendering processor 11, and rendering instructions for even number pages are assigned to the rendering processor 12. After this assigning method is set, rendering instructions for the subsequent odd number pages, that is, the 11th page, the 13th page, and so on, are assigned to the rendering processor 11, and rendering instructions for the subsequent even number pages, that is, the 12th page, the 14th page, and so on, are assigned to the rendering processor 12. Thus, the rendering processor 11 performs rendering processing for the 11th page, the 13th page, and so on, and the rendering processor 12 performs rendering processing for the 12th page, the 14th page, and so on.

In this case, for example, the rendering processor 11 performs rendering processing in accordance with the rendering instruction for the 11th page and then performs rendering processing in accordance with the rendering instruction for the 13th page. Since the rendering instruction similar to that for the 11th page exists for the 13th page, the similar rendering instructions and rendered results therefor are registered to the temporary memory 13 and are used for rendering processing for the 15th page and later pages. Similarly, the rendering processor 12 performs rendering processing in accordance with the rendering instruction for the 12th page and then performs rendering processing in accordance with the rendering instruction for the 14th page. Since the rendering instruction similar to that for the 12th page exists for the 14th page, the similar rendering instructions and rendered results therefor are registered to the temporary memory 14 and are used for rendering processing for the 16th page and later pages.

For example, at a timing after rendering processing for twenty pages is performed, it is determined whether or not to perform switching of an assigning method. The temporary memories 13 and 14 are used, and the usage rate at this time is higher than the usage rate for rendering processing for the first ten pages. For example, when the usage rate is equal to or higher than the predetermined threshold, switching of the assigning method is not performed and assigning of rendering instructions for the 21st page and the subsequent pages is performed continuously in the same assigning method.

For example, if the usage rate of a temporary memory is lower than the predetermined threshold even in the method for performing assigning of rendering instructions while discriminating between odd number pages and even number pages, a further different assigning method is selected and set. Then, assigning of rendering instructions for the subsequent ten pages is performed. Accordingly, in the case where the usage rate of a temporary memory is lower than the predetermined threshold, switching of a rendering instruction assigning method is performed. An assigning method that allows the usage rate of a temporary memory to exhibit a value equal to or higher than the predetermined threshold is found, and the assigning method is used. Thus, rendering processing that allows a rendering processor to utilize a temporary memory as much as possible is performed.

Figure 4:
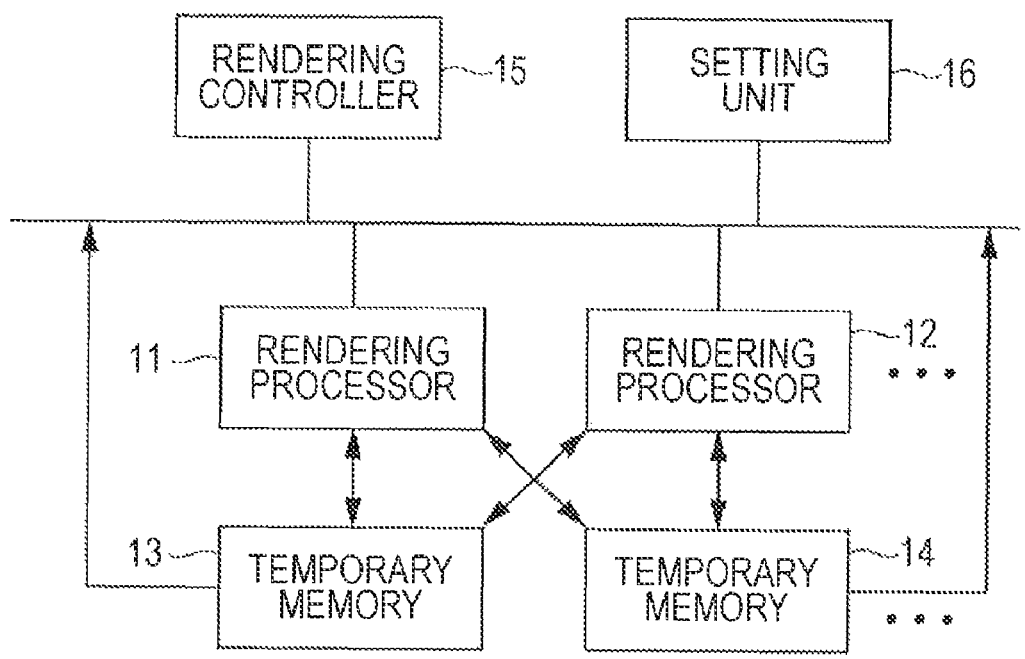
FIG. 4 is a diagram illustrating the configuration of a rendering device according to a variation of an exemplary embodiment of the invention.

FIG. 4 is a diagram illustrating the configuration of a rendering device according to a variation of an exemplary embodiment of the invention. Referring to FIG. 4, the rendering device further includes a setting unit 16. In this variation, an example in which the setting unit 16 is added to the configuration illustrated in FIG. 1 is illustrated.

The setting unit 16 functions as a determination setting unit that sets a timing at which the rendering controller 15 calculates a usage rate and that sets a threshold and the like for determining whether or not to perform switching of an assigning method. The setting unit 16 also functions as an assigning method setting unit that sets rendering instruction assigning methods, priority of the rendering instruction assigning methods, and the like. Obviously, at least one of these settings may be performed. Items that are not set by the setting unit 16 may be determined in advance. Obviously, other items may be set. Various settings for the setting unit 16 may be performed in accordance with instructions from a user, an external device, different software, or the like.

FIGS. 5A and 5B explain an example of setting screens of the setting unit 16. The setting unit 16 presents to users, for example, the setting screens illustrated in FIGS. 5A and 5B. Setting for the setting unit 16 may be performed in accordance with an instruction from a user. On the setting screen illustrated in FIG. 5A, an item for setting the number of pages as a timing at which a usage rate is to be calculated (described as "caching check") and an item for setting a threshold for determining whether or not to perform switching of an assigning method (described as "threshold for caching usage rate") are set. In this example, setting is performed such that the usage rate is calculated after rendering instructions for every ten pages are processed and switching of a rendering instruction assigning method is performed in the case where the usage rate of the temporary memories 13 and 14 is lower than 5% at the timing. The value set in the field for caching check is used for the determination as to whether or not the predetermined timing has been reached in in step S44 of the example of the process illustrated in FIG. 2. Obviously, in the case where this determination is made under other conditions, setting may be performed in accordance with the determination conditions. Furthermore, the value set in the field for a threshold for the caching usage rate is used for the determination regarding the usage rate in step S46 of the example of the process illustrated in FIG. 2.

The setting screen illustrated in FIG. 5B is an example of a screen for setting rendering instruction assigning methods and priority of the rendering instruction assigning methods. A rendering instruction assigning method described as "first-come first-served" is a method in which assigning of rendering instructions is performed in the order in which assigning requests were received from the rendering processors 11 and 12. A rendering instruction assigning method described as "odd number pages and even number pages separately" is a method for assigning rendering instructions for odd number pages to a rendering processor and assigning rendering instructions for even number pages to a different rendering processor. A rendering instruction assigning method described as "every n pages" is a method for assigning rendering instructions for consecutive n pages as a unit to a single rendering processor. A rendering instruction assigning method described as "from the first page and from the last page" is a method for assigning rendering instructions for the first page and the immediately subsequent page to a rendering processor and assigning rendering instructions for the last page and the immediately previous page to a different rendering processor. Furthermore, "user definition 5" and "user definition 6" are registered as assigning methods set by a user. Obviously, other assigning methods may be set.

Priority is given to the above-described assigning methods. In the example illustrated in FIG. 5B, the assigning method described as "first-come first-served" is set as a default assigning method. The assigning method described as "odd number pages and even number pages separately" is set as an assigning method with the highest priority level. The assigning method described as "every n pages" is set as an assigning method with the second highest priority level. The assigning method described as "from the first page and from the last page" is set as an assigning method with the third highest priority level. The assigning methods described as "user definition 5" and "user definition 6" are set as assigning methods with the fourth highest priority level and the fifth highest priority level, respectively. Obviously, the above-mentioned priority levels may be changed. Furthermore, in the example of the process illustrated in FIG. 2, priority may be changed in the processing of step S48. In this example, the assigning method described as "first-come first-served" is set as the default assigning method and no priority level is given to the assigning method. However, a priority level may be given to the assigning method, and the priority level thereof may be changed.

The setting screens illustrated in FIGS. 5A and 5B are merely an example. The configurations and contents of the setting screens may be changed. Furthermore, only one of the setting screens illustrated in FIGS. 5A and 5B may be provided or the setting screens illustrated in FIGS. 5A and 5B may be integrated with each other. Obviously, items may be added or removed according to need.

Figure 6:
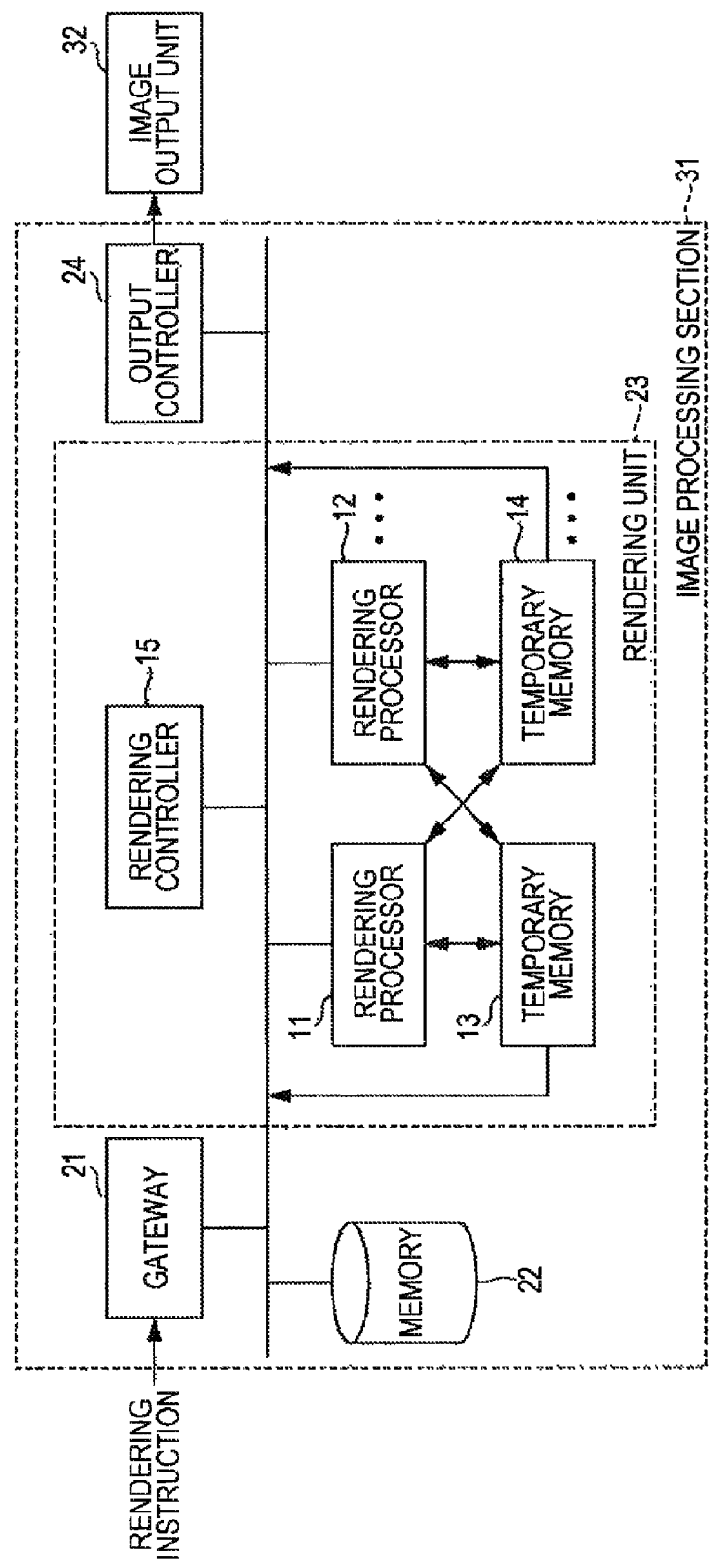
FIG. 6 is a diagram illustrating the configuration of an image output apparatus according to an exemplary embodiment of the invention.
Figure 7:
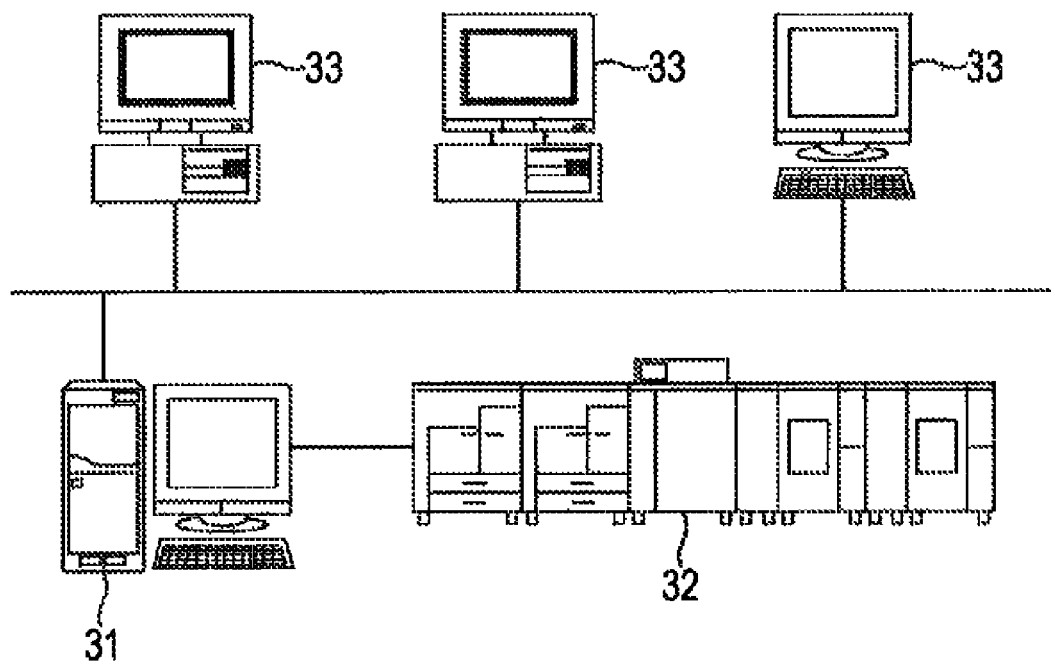
FIG. 7 is a diagram illustrating an example of the configuration of a system including the image output apparatus according to the exemplary embodiment of the invention.

FIG. 6 is a diagram illustrating the configuration of an image output apparatus according to an exemplary embodiment of the invention. FIG. 7 is a diagram illustrating an example of the configuration of a system including the image output apparatus according to the exemplary embodiment of the invention. Referring to FIGS. 6 and 7, the system includes a gateway 21, a memory 22, a rendering unit 23, an output controller 24, an image processing section 31, an image output unit 32, and terminals 33. In the system illustrated in FIG. 7, the image processing section 31 receives rendering instructions transmitted from the terminals 33. The image processing section 31 generates an image and transmits the generated image to the image output unit 32. The image output unit 32 outputs the image. The image processing section 31 and the image output unit 32 are not necessarily separately provided. The image processing section 31 and the image output unit 32 may be integrated with each other.

An example of the configuration of the image processing section 31 is illustrated in FIG. 6. The gateway 21 is an interface that receives rendering instructions transmitted from output devices, such as the terminals 33.

The memory 22 stores rendering instructions received at the gateway 21 and images rendered by the rendering unit 23. The temporary memories 13 and 14 of the rendering unit 23 may be arranged as the memory 22.

The rendering unit 23 has the configuration of the above-explained rendering device according to the exemplary embodiment of the invention. The rendering unit 23 reads a rendering instruction stored in the memory 22, renders an image in accordance with the rendering instruction, and stores the rendered image into the memory 22.

The output controller 24 reads an image rendered by the rendering unit 23 and stored in the memory 22, and controls the image output unit 32 to output an image. The functions of the rendering processors 11 and 12 and the rendering controller 15 of the rendering device according to the exemplary embodiment of the invention described above or the function of the output controller 24 of the image output apparatus according to the exemplary embodiment of the invention described above may be entirely or partially implemented by a program executed by a computer. In this case, the program, data to be used by the program, and the like may be stored in a computer readable storage medium. The storage medium induces the state in which magnetic energy, light energy, electric energy, or the like of a reading unit, which is provided in a hardware resource of the computer and is not illustrated, changes in accordance with programming instructions, and transmits the programming instructions to the reading unit in a corresponding signal form. For example, the storage medium may be a magneto-optical disk, an optical disk (including a compact disc (CD) and a digital versatile disk (DVD)), a magnetic disk, a memory (including an IC card, a memory card, and a flash memory), or the like. Obviously, the storage medium is not necessarily portable.

The functions of the rendering processors 11 and 12 and the rendering controller 15 of the rendering device according to the exemplary embodiment of the invention described above or the function of the output controller 24 of the image output apparatus according to the exemplary embodiment of the invention described above are entirely or partially implemented by storing a program on the storage medium, installing the storage medium into, for example, the reading unit, which is not illustrated, or an interface, which is not illustrated, of the computer, reading the program from the computer, storing the program into an internal memory or the memory 22 (including a magnetic disk and a silicon disk) in the case of the configuration illustrated in FIG. 6, and executing the program by a central processing unit (CPU). Alternatively, the functions of the rendering processors 11 and 12 and the rendering controller 15 of the rendering device according to the exemplary embodiment of the invention described above or the function of the output controller 24 of the image output apparatus according to the exemplary embodiment of the invention described above may be entirely or partially implemented by transferring the program to the computer via a communication path, receiving the program, for example, by the gateway 21 in the computer in the case of the configuration illustrated in FIG. 6, storing the program into the internal memory or the memory 22, and executing the program by the CPU.

Obviously, the rendering processors 11 and 12, the rendering controller 15, and the output controller 24 may be partially or entirely configured by hardware. Alternatively, a program of a different function may be included or part of a program of a different function may be incorporated. Furthermore, a configuration including various devices that are not illustrated may be provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A rendering device comprising:
a temporary memory that stores one or more rendering instructions and rendered results for the one or more rendering instructions in association with each other;
a plurality of rendering processing units that perform rendering processing in accordance with a rendering instruction, store, in a case where one or more similar rendering instructions exist for pages for which rendering processing was consecutively performed, the one or more rendering instructions and rendered results in association with each other in the temporary memory, and read and use, in a case where rendered results associated with one or more rendering instructions for rendering are stored in the temporary memory, the rendered results associated with the one or more rendering instructions; and
a rendering control unit that performs control for assigning a given rendering instruction to a corresponding one of the plurality of rendering processing units and causing the corresponding one of the plurality of rendering processing units to perform rendering processing, that calculates the usage rate of rendered results stored in the temporary memory at a predetermined timing, and that performs switching of an assigning method for assigning a rendering instruction in a case where the usage rate is lower than a predetermined threshold.

2. The rendering device according to claim 1, wherein the rendering control unit includes, as the assigning method for assigning a rendering instruction, a method for assigning rendering instructions to the plurality of rendering processing units in a predetermined page order.

3. The rendering device according to claim 2, further comprising a determination setting unit that sets the predetermined timing at which the rendering control unit calculates the usage rate and the predetermined threshold used for determining whether or not to perform switching of the assigning method.

4. The rendering device according to claim 3, further comprising an assigning method setting unit that sets priority to be used when switching is performed among a plurality of assigning methods, wherein the rendering control unit selects an assigning method in accordance with priority levels of the individual assigning methods.

5. The rendering device according to claim 2, further comprising an assigning method setting unit that sets priority to be used when switching is performed among a plurality of assigning methods, wherein the rendering control unit selects an assigning method in accordance with priority levels of the individual assigning methods.

6. The rendering device according to claim 1, wherein the rendering control unit includes, as the assigning method for assigning a rendering instruction, a method for assigning rendering instructions to the plurality of rendering processing units in a page order depending on a device that is to receive rendered results by the plurality of rendering processing units.

7. The rendering device according to claim 6, further comprising a determination setting unit that sets the predetermined timing at which the rendering control unit calculates the usage rate and the predetermined threshold used for determining whether or not to perform switching of the assigning method.

8. The rendering device according to claim 7, further comprising an assigning method setting unit that sets priority to be used when switching is performed among a plurality of assigning methods, wherein the rendering control unit selects an assigning method in accordance with priority levels of the individual assigning methods.

9. The rendering device according to claim 6, further comprising an assigning method setting unit that sets priority to be used when switching is performed among a plurality of assigning methods, wherein the rendering control unit selects an assigning method in accordance with priority levels of the individual assigning methods.

10. The rendering device according to claim 1, further comprising a determination setting unit that sets the predetermined timing at which the rendering control unit calculates the usage rate and the predetermined threshold used for determining whether or not to perform switching of the assigning method.

11. The rendering device according to claim 10, further comprising an assigning method setting unit that sets priority to be used when switching is performed among a plurality of assigning methods, wherein the rendering control unit selects an assigning method in accordance with priority levels of the individual assigning methods.

12. The rendering device according to claim 1, further comprising an assigning method setting unit that sets priority to be used when switching is performed among a plurality of assigning methods, wherein the rendering control unit selects an assigning method in accordance with priority levels of the individual assigning methods.

13. A non-transitory computer readable medium storing a program causing a computer to implement functions of the rendering device according to claim 1.

14. An image output apparatus comprising an output unit that receives a rendered result by the rendering device according to claim 1 and outputs an image.

* * * * *